(12) United States Patent
Guguen et al.

(10) Patent No.: US 8,279,894 B2
(45) Date of Patent: Oct. 2, 2012

(54) METHOD AND DEVICE FOR DATA PACKET ASSEMBLY

(75) Inventors: Charline Guguen, Bourgbarré (FR); Ludovic Jeanne, Rennes (FR); Patrick Fontaine, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 471 days.

(21) Appl. No.: 12/225,399

(22) PCT Filed: Mar. 9, 2007

(86) PCT No.: PCT/EP2007/052250
§ 371 (c)(1),
(2), (4) Date: Apr. 19, 2010

(87) PCT Pub. No.: WO2007/107467
PCT Pub. Date: Sep. 27, 2007

(65) Prior Publication Data
US 2010/0202473 A1     Aug. 12, 2010

(30) Foreign Application Priority Data

Mar. 20, 2006  (FR) .................................... 06 50955

(51) Int. Cl.
*H04J 3/16* (2006.01)
*H04J 3/00* (2006.01)
*H03M 13/00* (2006.01)
(52) U.S. Cl. ......... 370/474; 370/471; 370/476; 714/758
(58) Field of Classification Search .................. 370/338, 370/471, 474, 476; 714/758
See application file for complete search history.

(56) References Cited

U.S. PATENT DOCUMENTS

| 6,327,271 | B1 | 12/2001 | Gotesman et al. |
| 7,636,342 | B2 * | 12/2009 | Tang ............................. 370/338 |
| 2004/0233878 | A1 | 11/2004 | Liu et al. |
| 2005/0008035 | A1 * | 1/2005 | Eklund et al. ................. 370/473 |
| 2005/0163274 | A1 | 7/2005 | Ito |

FOREIGN PATENT DOCUMENTS

| EP | 0932270 | 7/1999 |
| JP | 11215136 | 8/1999 |
| JP | 11266216 | 9/1999 |
| JP | 2005176234 | 6/2005 |

OTHER PUBLICATIONS

Search Report Dated May 14, 2007.

* cited by examiner

*Primary Examiner* — Ricky Ngo
*Assistant Examiner* — Paul H Masur
(74) *Attorney, Agent, or Firm* — Myers Wolin, LLC

(57) ABSTRACT

The assembly of data blocks to form at least one data packet includes: writing in a first register of at least one first data block descriptor, which includes information representing a status of each block belonging to a set of blocks, whereby the status of each block indicates whether the block has been stored; the determination and recording in a second register of a status of the blocks, which represents the state of storage of the blocks, whereby this operation, based on the use of a second register, enables simple and fast acquisition of the status of a packet which can be assembled on the basis of the blocks; and the assembly of a packet containing the blocks according to the status recorded in the second register.

16 Claims, 8 Drawing Sheets

METHOD AND DEVICE FOR DATA PACKET ASSEMBLY

This application claims the benefit, under 35 U.S.C. §365 of International Application PCT/EP2007/052250, filed Mar. 9, 2007, which was published in accordance with PCT Article 21(2) on Sep. 27, 2007 in English and which claims the benefit of French patent application No. 0650955, filed Mar. 20, 2006.

1. DOMAIN OF THE INVENTION

The present invention relates to the domain of telecommunications and, more precisely, high-speed packet reception.

2. TECHNOLOGICAL BACKGROUND

According to the prior art, data packet transmission methods implement mechanisms for dividing packets into data blocks at the transmitting end, then for reassembling the blocks into packets at the receiving end.

In the MAC ("Medium Access Control") layer, the data to be transmitted or MSDUs ("MAC Service Data Units") are encapsulated in PDUs ("Protocol Data Units") with an MAC header. When MSDUs are transmitted, they may be fragmented, whereby one or more parts (or fragments) of an MSDU are transmitted in the same PDU, while the remaining parts are transmitted in one or more other PDUs. One PDU may also comprise fragments of different MSDUs.

A method of this type implemented by a microprocessor of a receiving station compatible with an IEEE802.16 standard is shown in FIG. 1 and starts with an initialization step 10. Then, during a step 11, one or more data packets corresponding to an MSDU associated with a set of blocks are received. Then, during a step 12, the station identifies the correctly received blocks. Then, during a step 13, the microprocessor attempts to assemble the blocks received as MSDUs. The step 13 begins with a step 130 involving initialization of a current block pointing at the first received block. Then, during a test 131, the microprocessor checks whether the current block is valid (using for example an error detection code). If not, the step 13 ends with an MSDU assembly failure status. If so, during a step 132, the microprocessor builds an MSDU by inserting the current block into it. Then, during a test 133, the microprocessor checks whether the current block is the final block of the MSDU. If so, the step 13 ends successfully, with an MSDU being assembled. If not, in a step 134, the current block points to the following received block and the test 131 is reiterated. Thus, the MSDU assembly process is relatively long, since the number of elementary operations is high (at least three times (corresponding to the steps 131 to 133) the number of blocks present in an MSDU, with each of these blocks being tested by the microprocessor). This technique therefore has the disadvantage of being poorly adapted to applications which require significant reactivity (for example audiovisual flow transmission applications).

3. SUMMARY OF THE INVENTION

The object of the invention is to overcome these disadvantages of the prior art.

More particularly, the object of the invention is to improve the performance of a communications system (for example the speed and/or simplicity of assembly of an MSDU).

For this purpose, the invention proposes a method for assembling data blocks to form at least one data packet, comprising the following steps:

writing in a first register of at least one first data block descriptor, each first descriptor comprising information representing a status of each block belonging to a set of blocks, whereby the status of each block indicates whether or not the block has been stored;
  determination and recording in a second register of a status of at least part of the set, whereby the status represents the state of storage or non-storage of the blocks in the part of the set;
  assembly of a packet containing the blocks of the set according to the status recorded in the second register.

Advantageously, the step to determine a status is an elementary step carried out in at most a number of clock cycles strictly less than the size of the first register, expressed as a number of binary data and, even more advantageously, in at most one clock cycle.

According to a preferred characteristic, the writing of the first register involves a purely electronic update of the second register.

Advantageously, the method also comprises a step to determine the position of a first packet block, said step comprising the following steps:

writing in a third register of at least one second first block descriptor, each second descriptor comprising information indicating for each block whether or not a first packet block is involved; and
  determination of the first block in a packet on the basis of the content of the third register, and recording of an identifier of the first block in a fourth register;

the assembly of a packet containing the blocks of the set being carried out according to the identifier recorded in the fourth register.

Advantageously, the step to determine the first block in a packet is an elementary step carried out in at most a number of clock cycles strictly less than the size of the third register expressed as a number of binary data.

According to an advantageous characteristic, the method comprises a step to determine the position of a final packet block, said step comprising the following steps:

writing in a fifth register of at least one third final block descriptor, each third descriptor comprising information indicating for each block whether or not a final packet block is involved; and
  determination of the final block in a packet on the basis of the content of the fifth register, and recording of an identifier of the final block in a packet to be transmitted in a sixth register;

the assembly of a packet containing the blocks of the set being carried out according to the identifier recorded in the sixth register.

Advantageously, the step to determine the final block in a packet is an elementary step carried out in at most a number of clock cycles strictly less than the size of the fifth register expressed as a number of binary data.

According to a particular characteristic, the steps to determine the final packet and to determine the status are simultaneous.

Preferably, the determination of the number of blocks in a packet to be assembled is made according to the content of the fourth and sixth registers.

According to an advantageous characteristic, the steps to determine a status and to determine the final block are reiterated for as long as the status stored in the second register indicates that packets are stored and/or that a final packet block has not been identified.

According to particular characteristics, the status recorded in the second register belongs to a set which comprises:

packet assembly status possible;

packet assembly status not possible because the end of the packet has not been detected; and packet assembly status not possible because at least part of the packet is not stored and/or received.

Advantageously, the method comprises a data block reception step, whereby the status associated with each block indicates whether or not the block has been correctly received.

According to a particular characteristic, the blocks are received in data frames transmitted on a wireless channel, for example according to an IEEE802.16 communication protocol.

The invention also relates to a data block assembly device to form at least one data packet, said device comprising:

means for writing in a first register at least one first data block descriptor, each first descriptor comprising information representing a status of each block belonging to a set of blocks, whereby the status of each block indicates whether or not the block has been stored;

means for determining and recording in a second register a status of at least part of the set, whereby the status represents the state of storage or non-storage of the blocks in the part of the set;

means for assembling a packet containing the blocks of the set according to the status recorded in the second register.

4. LIST OF FIGURES

The invention will be more readily understood and other features and advantages will become evident from reading the description which follows, referring also to the attached drawings, in which.

5. DETAILED DESCRIPTION OF THE INVENTION

Figure 1:
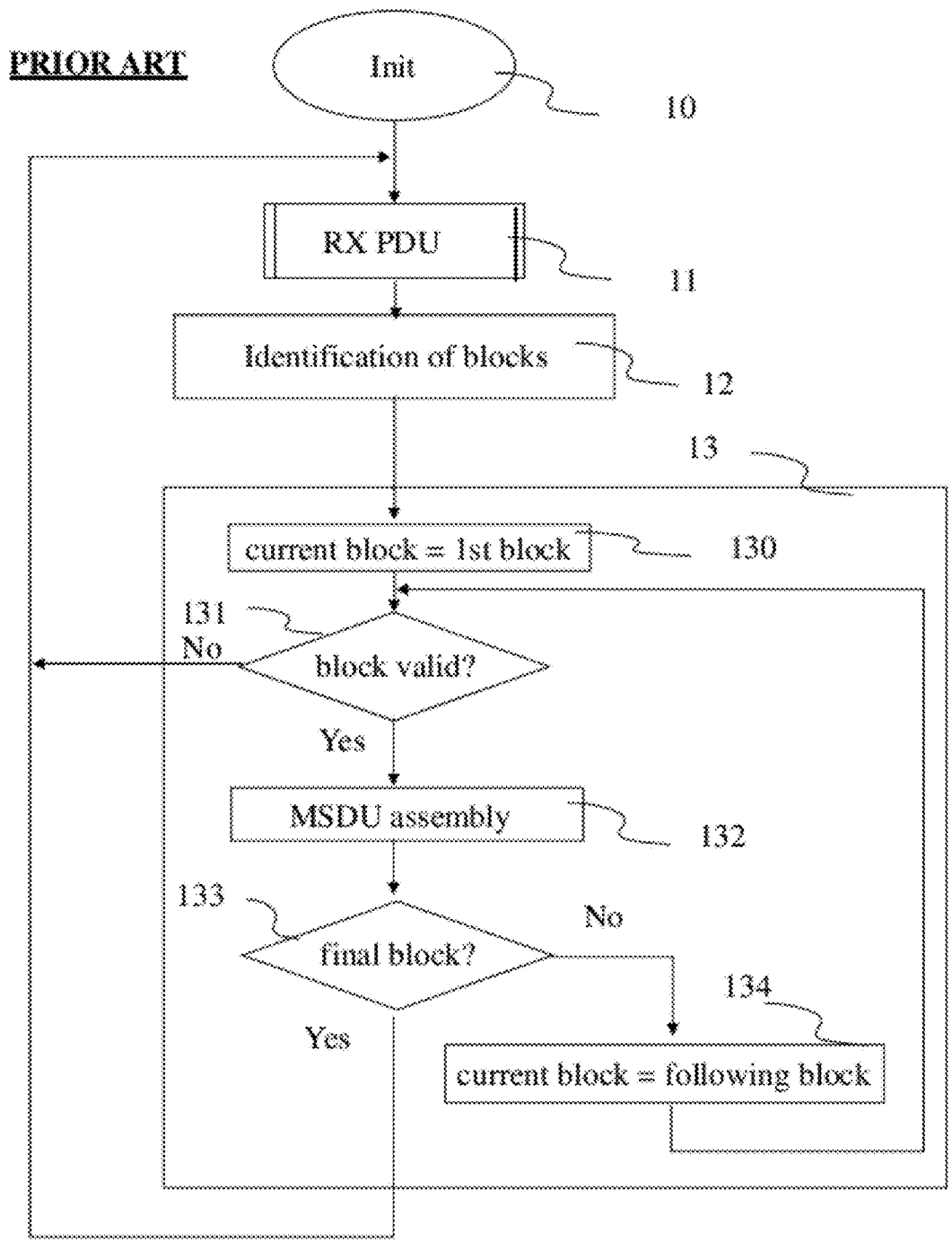
FIG. 1 shows an embodiment of a packet transmission known per se.
Figure 2:
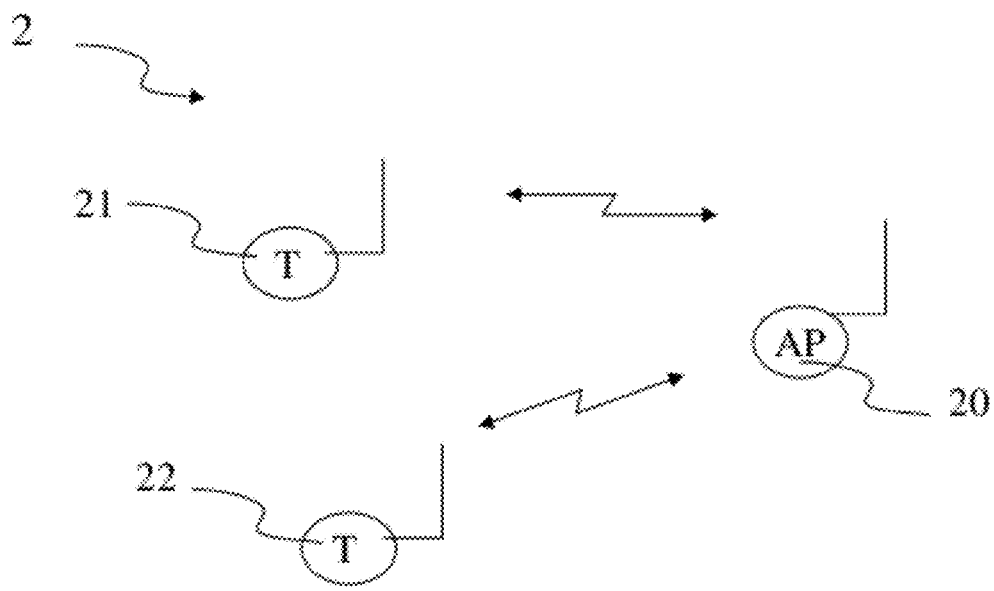
FIG. 2 shows a communications network according to a particular embodiment of the invention.

FIG. 2 shows a communications network 2 according to a particular embodiment of the invention.

The network 2 is, for example, a wireless network according to IEEE802.16, comprising:

an access point 20;

terminals 21 and 22.

The access point 20 is capable of transmitting or receiving MSDUs to the terminals 21 and 22 on the wireless link.

Figure 7:
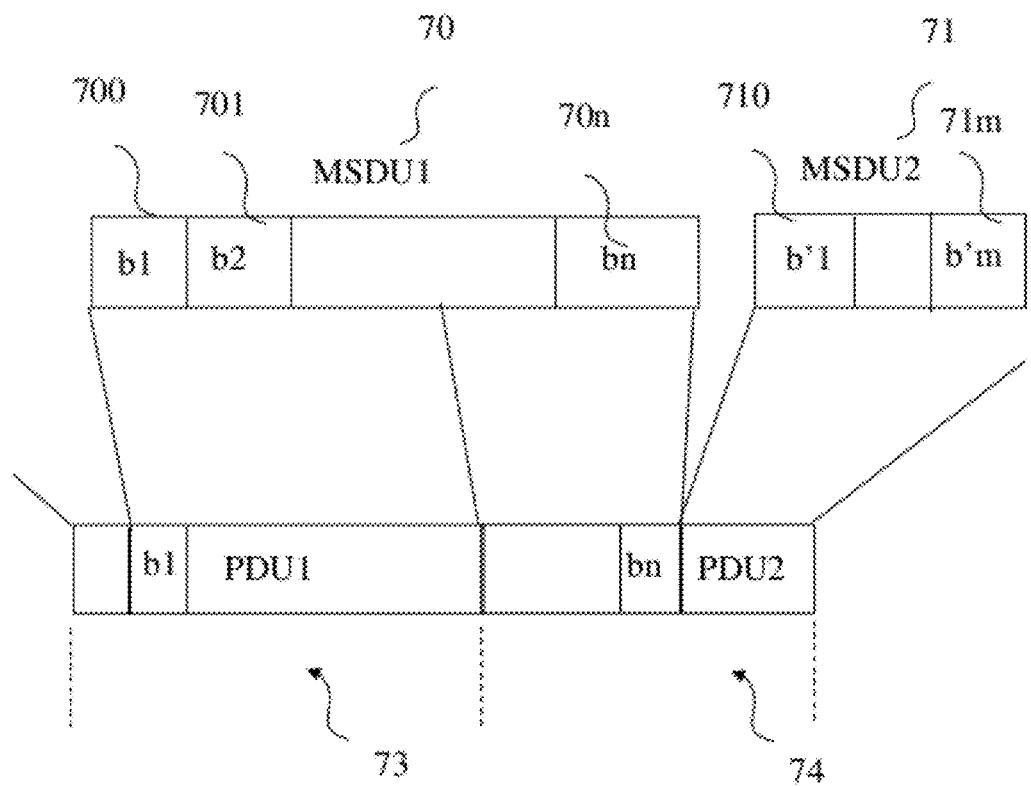
FIG. 7 shows the fragmentation of packets processed by the device shown in FIG. 3.

FIG. 7 shows schematically the structure of two MSDUs 70 and 71. Thus, by way of illustration, the MSDU 70 comprises n blocks 700 to 70n and the MSDU 71 comprises m blocks 710 to 71m. A first PDU 73 comprises blocks corresponding to an MSDU (not shown) and the first blocks of the MSDU 70. A second PDU 74 comprises the following blocks of the MSDU 70 and all of the blocks of the MSDU 71. When the PDUs are transmitted in radio frames according to the IEEE802.16 standard, headers enable identification of the starts of PDUs and their size. Sub-headers also enable identification of the first block, the final block and any intermediate blocks of each MSDU, as well as the size of each MSDU block.

Figure 3:
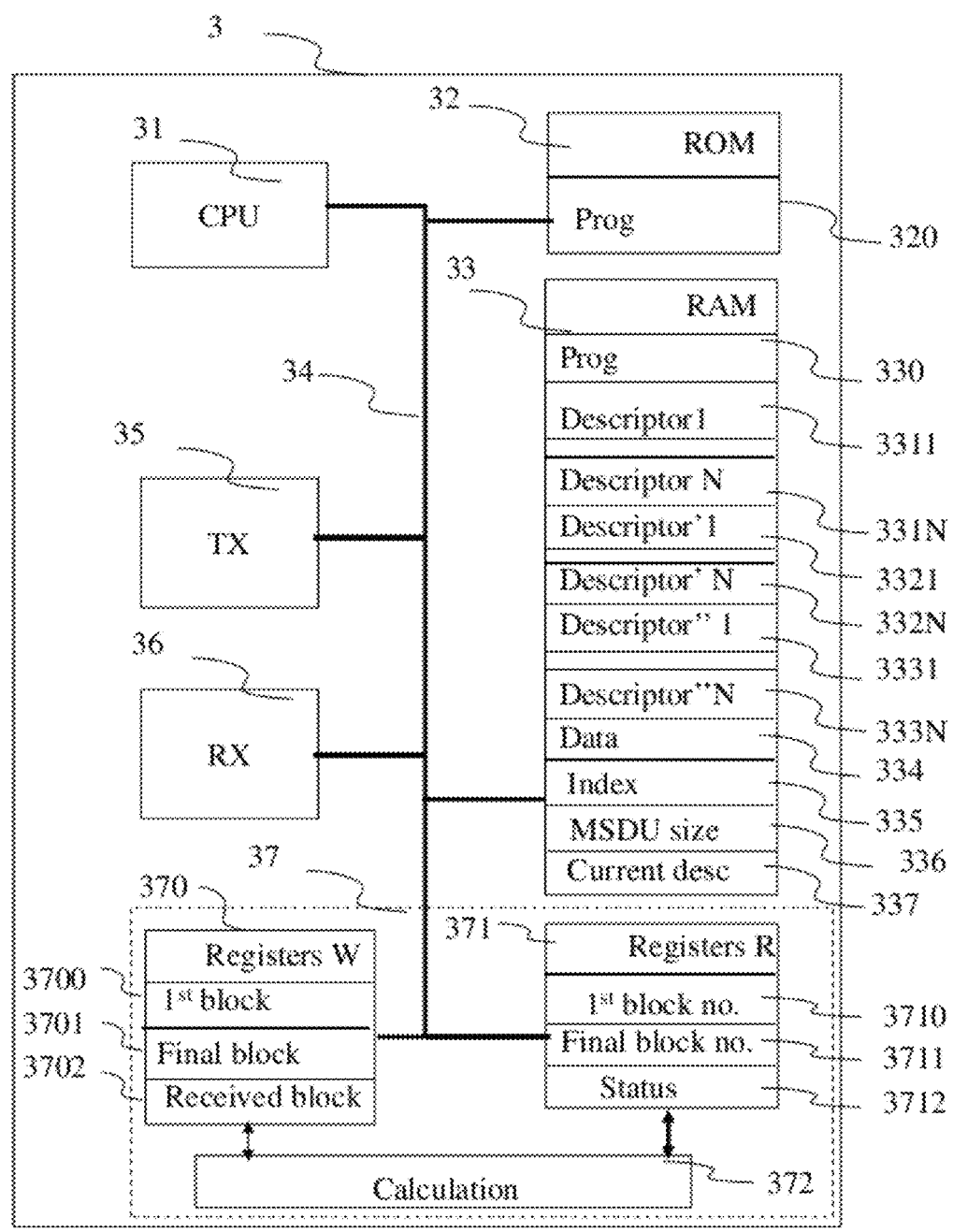
FIG. 3 shows schematically a device of the communications network shown in FIG. 2, according to a particular embodiment of the invention.

FIG. 3 shows schematically a device 3 corresponding to the access point 20 or to one of the terminals 21 and 22.

The device 3 comprises, interconnected by an address and data bus 34, also transporting a clock signal:

a microprocessor 31 (or CPU);

a non-volatile ROM memory 32 ("Read Only Memory");

a RAM memory 33 ("Random Access Memory");

a transmission module 35 to transmit a signal on the wireless link;

a reception module 36 to receive a signal on the wireless link; and a received block management module 37.

Moreover, each of the elements 31 to 36 is well known to the person skilled in the art. These common elements are not described here.

It will be noted that the word "register" used in the description designates, in each of the memories mentioned, not only a low-capacity memory zone (a few binary data) but also a high-capacity memory zone (enabling storage of an entire program or all or part of the data representing a received audio/video service).

The ROM memory 32 comprises in particular a program "prog"320.

The algorithms implementing the steps of the method described above are stored in the ROM memory 32 associated with the device 3 implementing these steps. When booted up, the microprocessor 31 loads and performs the instructions of these algorithms.

The RAM memory 33 comprises in particular:

in a register 330, the operating program of the microprocessor 31 loaded when the device 3 is booted up;

N descriptors of first MSDU blocks stored and/or received in registers 3311 to 331N;

N descriptors of final MSDU blocks stored and/or received in registers 3321 to 332N;

N descriptors of MSDU blocks stored and/or received correctly in registers 3331 to 333N;

data (for example audiovisual and/or file-type data) and/or PDUs containing data in a register 334;

an index counter 335;

a current MSDU size 336; and a pointer to a current MSDU descriptor in a register 337.

The received block management module 37 comprises:

a module 370 comprising registers 3700 to 3702 intended in particular for the writing by the CPU 31 of descriptors respectively of first blocks, final blocks and correctly received blocks, each of the registers 3700 to 3702 having its own address for write access by the CPU 31 via the bus 34;

a module 371 comprising a register 3710 identifying the rank order (or number) of the first block of the current MSDU, a register 3711 identifying the final block of the current MSDU and a status register 3712 corresponding to a current MDSU, whereby the registers 3710 to 3712 each have their own address for read access by the CPU 31 via the bus 34; and a module 372 to determine the content of the registers of the module 371 from the registers of the module 370.

According to the invention, the module 37 is an electronic block comprising one or more discrete components (for example, ASIC or programmable components) or inserted totally or partially in a component comprising other functions (for example ASIC comprising the memories 32 and/or 33 and/or the CPU 31).

According to the embodiment described, the descriptors comprise 32 bits. According to implementation variants of the invention, the descriptors have a fixed size other than 32 bits (which may range from a few bits (for example 8) to several hundred or thousand bits), or a variable size. Typically, each bit of the descriptor corresponds to a received block and its significance depends on the descriptor type:

In the descriptors of first (or final) blocks, a 1 bit corresponds to a first (or final) MSDU block, and a 0 bit corresponds to the absence of a block or to a block which is not the first (or final) block of an MSDU; and in the descriptors of stored and/or received blocks, a 1 bit corresponds to a stored and/or received MSDU block.

Other significances or values (for example values other than those previously described) and other formats (for example a plurality of bits for each of the descriptors, and/or the three descriptor types combined into one or two descriptor types) are of course possible according to the invention.

For the sake of clarity, only the descriptors relating to the first or final MSDU blocks and the stored and/or received blocks will be described. Other descriptors may be implemented, particularly connection descriptors relating to each application. The described block descriptors are updated, particularly on reception of a frame containing one or more PDUs.

The module 372 is implemented in electronic form, preferably in the form of logic circuits in a programmable component (for example a gate array), PLD® ("Programmable Logic Device") or in an ASIC. A circuit of this type is, for example, obtained and optimized by a VHDL definition of its content, corresponding, for example, to logic equations corresponding to the algorithm shown in FIG. 9.

Such an implementation of the module 372 offers the advantage that it includes simple logic functions and requires relatively few logic gates.

Moreover, the module 372 reads directly into the registers 3700 to 3702 the descriptors whose value it converts into a first block number, a final block number and a status. The latter are automatically stored in the respective registers 3710 to 3712 by the module 372. Thus, the content of the registers 3700 to 3702 is more or less immediately determined, with a result recorded in the registers 3710 to 3712. In this way, in at most a number of clock cycles strictly less than the size of the registers 3700 to 3702, expressed as a number of binary data (e.g. 32), and preferably in less than one clock cycle, following the writing in the register 3702, the registers 3710 to 3712 are updated. The CPU 31 writing a descriptor in the register 3702 can therefore read the content of the registers 3710 to 3712 as from the following clock cycle.

Figure 4:
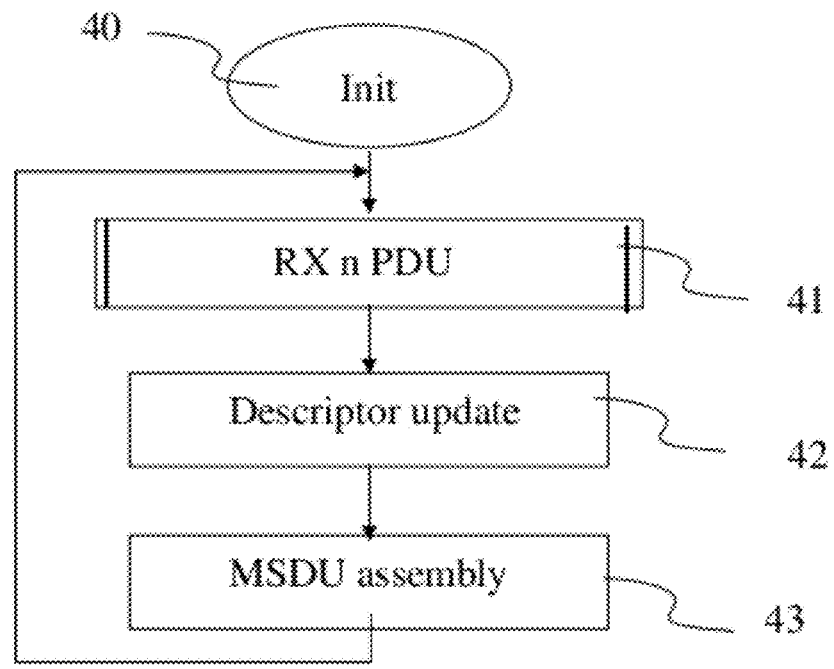
FIGS. 4 to 6 and 9 show a reception method implemented in the device shown in FIG. 3.

FIG. 4 shows schematically a data packet reception algorithm implemented in the device 3.

During a first step 40, the device 3 initializes its different components and variables.

Then, during a step 41, the device 3 waits for then receives a data frame comprising n PDUs which have been transmitted on the wireless medium, where n represents a non-zero integer.

Then, during a step 42, the device 3 carries out a cartography of the first and final MSDU blocks and the correctly received MSDU blocks by updating the descriptors 3311 to 331N, 3321 to 332N and 3331 to 333N of the memory 33.

Then, during a step 43, the device 3 assembles the MSDU (s) corresponding to the received frame. The step 41 is then reiterated.

These steps are implemented in part by the CPU 31 and in part by the module 37. The implementation of the software part by the CPU 31 is preferably carried out in multitask or pseudo-multitask form, whereby the steps 41, 42 and 43 can be performed by different tasks.

The step 43 can be carried out at different times or following various events and in particular:

following the reception of a frame (as shown schematically in FIG. 4);

in the event of connection changes (particularly if a plurality of applications use the data reception resources of the device 3); and/or at the end of a defined time period;

following reception of a predefined quantity of blocks;

following reception of a final MSDU block; and/or a combination of the aforementioned different times and/or events (for example following reception of a final MSDU block then the expiry of a time period if intermediate blocks have not been correctly received).

Figure 5:
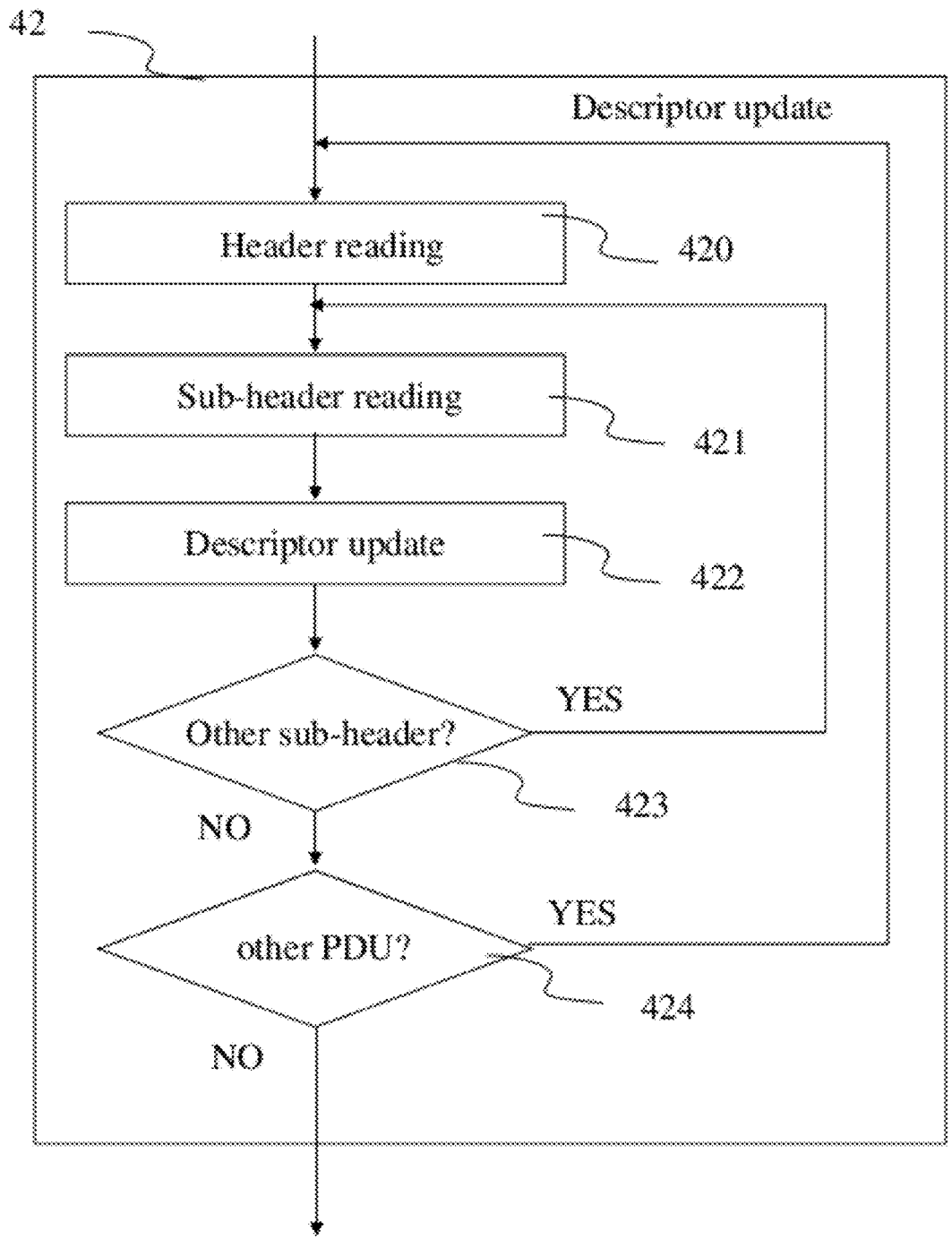

FIG. 5 shows the step 42 which begins with a frame header reading step 420, said header corresponding to a PDU start in accordance with the IEEE802.16 standard.

Then, during a step 421, the receiver 3 reads a sub-header if it is present.

Then, during a step 422, the microprocessor 31 updates the first block descriptors 3311 to 331N and the final block descriptors 3321 to 332N in the memory 33 according to the content of the header and/or sub-header which indicate whether the following blocks correspond to first and/or final MSDU blocks. The microprocessor 31 also updates the received block descriptors 3331 to 333N according to the blocks which have actually been correctly received.

Then, during a test 423, the receiver 3 checks whether at least one other sub-header is present in the current PDU and, if so, the step 421 is reiterated (the reading step 421 and test step 423 may be carried out simultaneously).

If not, during a test 424, the receiver 3 checks whether at least one other PDU is present in the received frame and, if so, the step 420 is reiterated (the reading step 420 and test step 424 may be carried out simultaneously). If not, the step 42 is ended.

Figure 6:
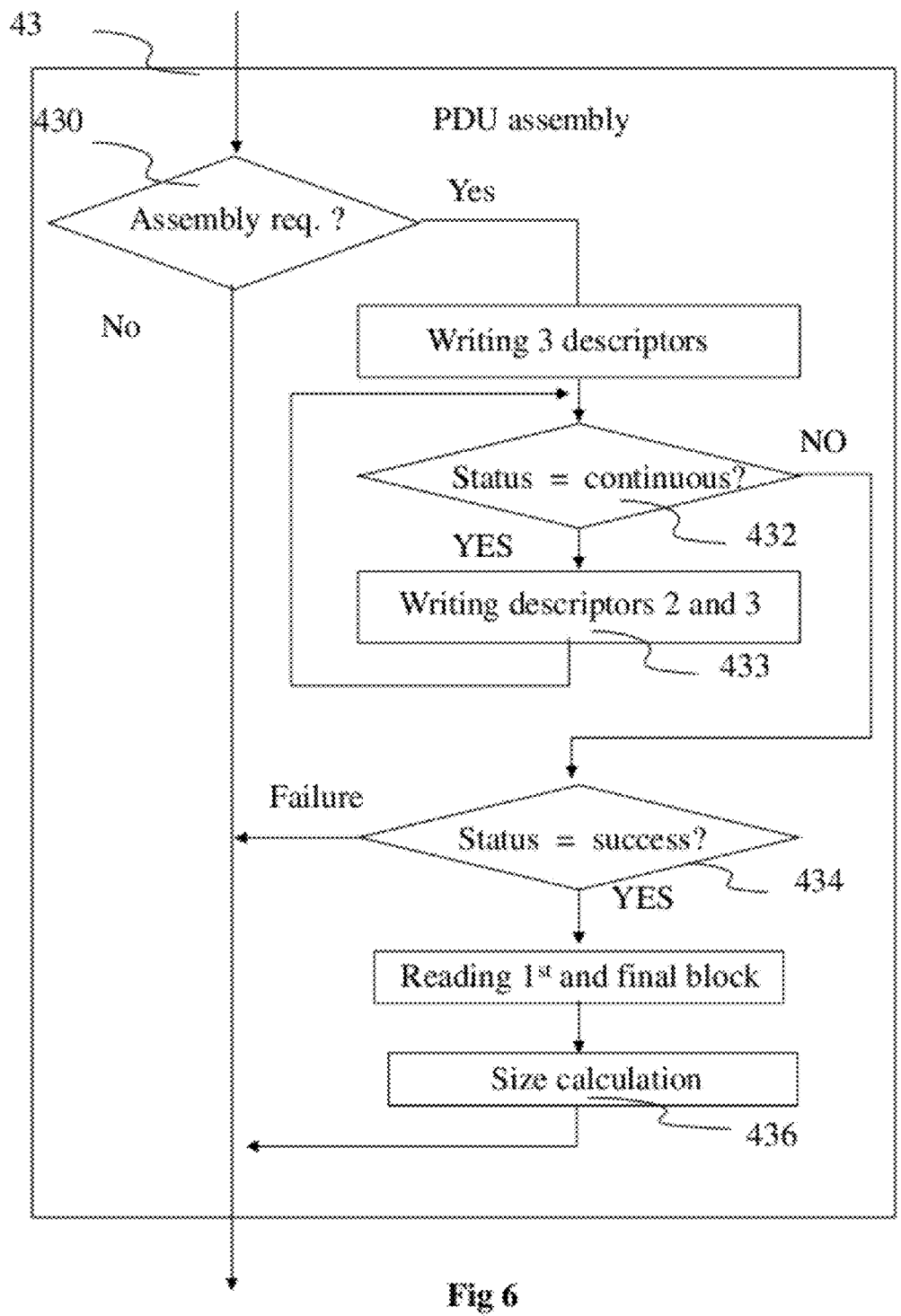

FIG. 6 shows in detail the step 43 entailing assembly of MSDU packets using descriptors of first, final and received blocks.

The set of received blocks has different associated statuses, in particular statuses of first block in an MSDU packet, final block in an MSDU packet and correctly received block. When a header or a block has been received, the statuses are updated. The status of each block is stored with the aid of the 32-bit descriptors in the memory 33, whereby each of the bits corresponds to the status of a specific block. Thus, for the first block statuses in an MSDU packet, the corresponding status of the first 32 blocks received is stored in the descriptor 3311 and the status of the following 32 blocks is stored in the following descriptor 3312, and so on up to the descriptor 331N. For a maximum number of blocks equal to 2048, N equals 64. The format of the descriptors 3321 to 332N and 3331 to 333N is similar to that of the descriptors 3311 to 331N.

The step 43 begins with a test 430, during which the CPU 31 checks whether an assembly is required following any given criteria (timeout, change of connection, any given initiation event, reception of a frame, etc.). If not, the step 43 ends with a return corresponding to an assembly not required.

If so, the CPU 31 writes the respective content of the memories 3311, 3321 and 3331 in the registers 3700 to 3702 of the module 37 by storing an MSDU pointer 337 corresponding to the first block descriptor (for the sake of clarity, it has been assumed that the current descriptors correspond to the content of the memories 3311, 3321 and 3331; in practice, the current descriptors may correspond to any given descriptors in the memory 33). The module 372 then updates the status register 3710, preferably in at most one clock cycle following the writing in the register 3702. The CPU 31 also initializes the index counter 335 to 0.

Then, during a test 432, the CPU reads the assembly status, updated and present in the register 3710, and checks whether this status corresponds to "continuous".

If so, the blocks which follow the first MSDU block identified by the content of the register 3700 are, in view of the content of the register 3702, correctly received. Conversely, there is no final MSDU block identified among the first MSDU block and the following blocks. During a step 433, the CPU 31 then writes the following final MSDU block and correctly received block descriptors (for example 3322 and 3332 during the first performance of the step 433) in the registers 3701 and 3702 respectively. The module 372 then updates the status register 3710 in at most a number of clock cycles strictly less than the size of the registers 3700 to 3702, expressed as a number of bits (e.g. 32), and, preferably, in at most one clock cycle following the writing in the register 3702. The CPU 31 also increments the index counter 335 by one unit. The status corresponds to predetermined values, for example, over three bits:
  a first bit corresponding to a success status, this being 1 if an MSDU can be assembled (final block determined and blocks between the first and final blocks inclusive correctly received), and 0 in the opposite case;
  a second bit corresponding to a failure status, this being 1 if at least one block from among the blocks which follow the first block and precede the final block of an MSDU packet to be assembled and which are associated with the current descriptor of blocks correctly received has not been correctly received, and 0 in the opposite case;
  a third bit corresponding to a "continuous" status, this being 1 if all the blocks which follow the first block and precede any final block (corresponding to the current final block descriptor) of an MSDU packet to be assembled and which are associated with the current descriptor of blocks correctly received have been correctly received, and 0 in the opposite case.

If the result of the test 432 is negative, during a test 434, the CPU 31 checks whether the assembly status corresponds to a success. If not, the step 43 ends with a return corresponding to a failed assembly, whereby blocks of the MSDU identified by its first block have not been correctly received.

If so, all the blocks of the MSDU identified by its first and last block have been correctly received and this MSDU can be assembled. Thus, during a step 434, the CPU 31 reads the rank order of the first block in the register 3710; at the time of writing in the register 3700, the CPU 31 has stored information in the register 337 indicating the set of 32 blocks to which the first block corresponds; thus, the first block of the current MSDU is clearly identified by its rank order in the first block descriptor and the correspondence between this descriptor and the received data. The CPU 31 also reads the rank order of the final block in the register 3711.

Then, during a step 436, the CPU 31 calculates the size 336 of the MSDU to be assembled, this size, expressed as a number of blocks, being equal to the size of a descriptor (32 in the example shown), multiplied by the value of the index counter 335 to which the value of the rank order of the final block plus 1 is added, and the value of the rank order of the first block is subtracted, i.e. to summarize:

MSDU size=32·counter+register 3711−register 3710+1.

The MSDU packet is thus assembled by the CPU 31 according to the first MSDU block identifier and the calculated number of MSDU blocks. To simplify the implementation of the invention, the size of the blocks is preferably the same for all blocks (except possibly for the final block of an MSDU). The CPU 31 then transmits the data of the assembled MSDU (or a pointer to these data) to the destination application and the step 43 is ended.

According to a particularly suitable variant of the invention, if the blocks are not all of the same size, the size of an MSDU is expressed in octets. The index counter is then also expressed in octets and updated taking into account the actual size of each block (for example, according to the size expressed in octets which is indicated in a sub-header).

According to a different variant of the invention, the assembled MSDU is identified with the aid of a pointer to its first block and a pointer to its final block, the latter preferably being calculated with the aid of the pointer to the first block, plus the size of a descriptor (32 in the example shown), multiplied by the value of the index counter 335 and the value of the rank order of the final block, minus the value of the rank order of the first block.

Figure 8:
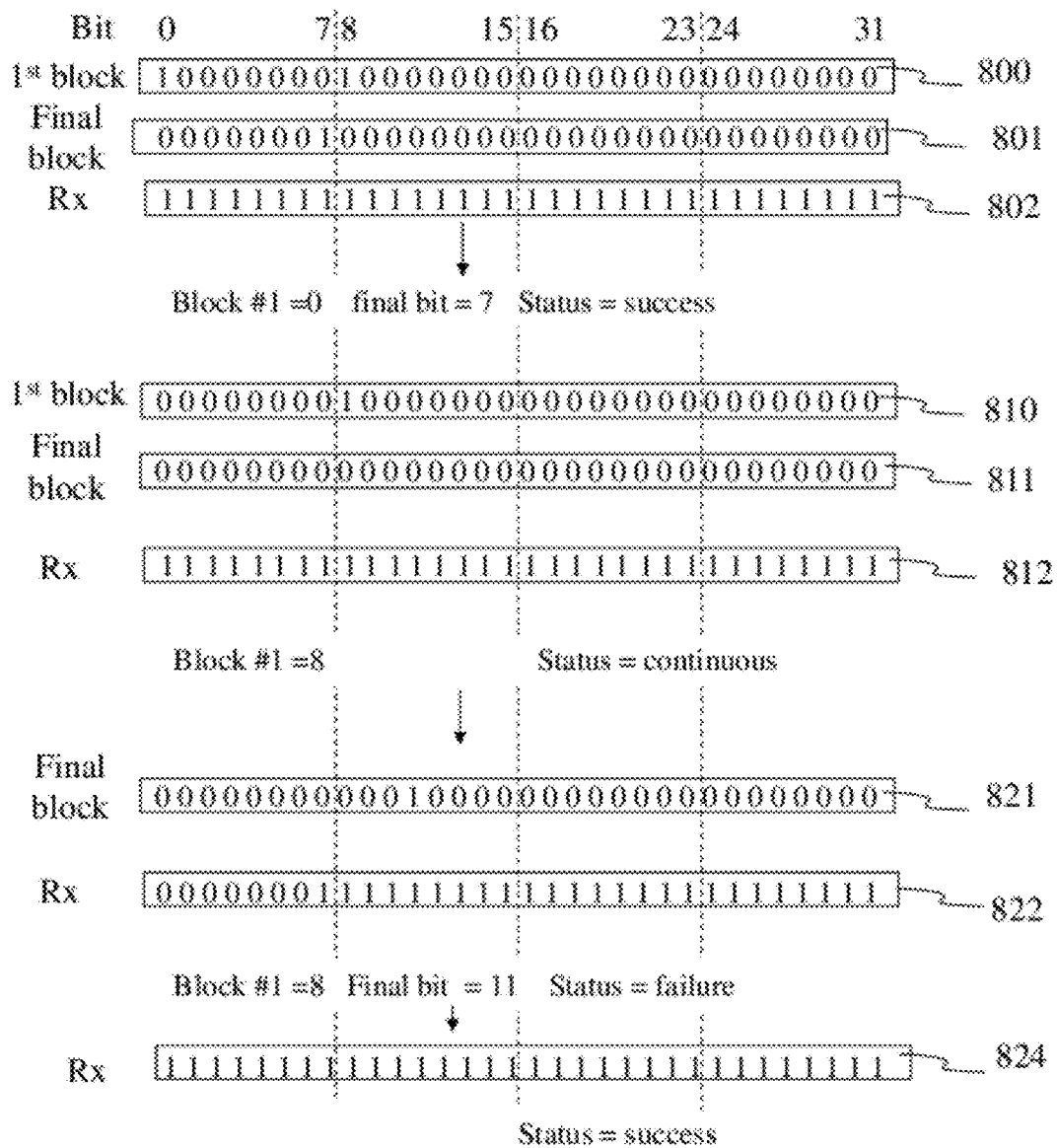
FIG. 8 presents an example of the change in the content of registers implemented in the device shown in FIG. 3.

To illustrate this, FIG. 8 shows an example of the change in the content of registers corresponding to specific descriptors.

If the device 3 receives a radio frame, the CPU 31 writes the corresponding descriptors in the memory 33. Thus, for example, a first MSDU block descriptor 800 comprises values 00000101H in hexadecimal notation (in the descriptors represented in binary notation in FIG. 8, the least significant bits (LSB) are shown on the left in ascending block rank order), a final block descriptor 801 comprises 00000080H and a correctly received block descriptor comprises FFFFFFFFH.

Following the writing of the descriptors 800 to 802 in the registers 3700 to 3702 respectively, the first block register 3710 contains the value 0 (the bit with a rank order of 0 of the descriptor 800 being 1), the final block register 3711 contains 7 (the bit with a rank order of 7 of the descriptor 801 being 1 and all the bits with a rank order of 0 to 6 being 0) and the assembly status register 3712 indicating successful assembly (all the bits with a rank order of 0 to 7 of the descriptor 802 being 1). The size of the MSDU expressed as a number of blocks is equal to 32×Counter+7−0+1, i.e. 8. An MSDU with size 8 whose first block corresponds to the bit 0 of the descriptor 800 can then be transmitted to the destination application.

The descriptors are then updated. With the preceding final block descriptor not pointing to the final element of this descriptor, the same set of 32 blocks remains.

Thus, the current first block descriptor 810, final block descriptor 811 and received block descriptor contain the values 00000100H, 00000000H and FFFFFFFFH respectively.

Following the writing of the descriptors 810 to 812 in the registers 3700 to 3702 respectively, the first block register 3710 contains the value 8 (the bit with a rank order of 8 of the descriptor 810 being 1) and the assembly status register 3712 indicating a continuous status (no bits of the descriptor 811 being 1 and all the bits with a rank order of 8 to 31 of the descriptor 812 being 1). The index counter value is then 1.

The following final block descriptor 821 and received block descriptor 822 contain values 0080000000H and 08FFFFFFH respectively.

Following the writing of the descriptors 821 and 822 in the registers 3701 and 3702 respectively, the final block register 3711 contains the value 11 (the bits with a rank order of 0 to 10 of the descriptor 821 being 0 and the bit with a rank order of 11 being 1) and the assembly status register 3712 indicating a failure status (bits with a rank order of 0 to 11 of the descriptor 822 being 0). The index counter value remains equal to 1.

The following final block descriptor 821 and received block descriptor 824 contain values 0080000000H and FFFFFFFFH respectively.

Following the writing of the descriptors 821 and 824 in the registers 3701 and 3702 respectively, the final block register 3711 contains the value 11 and the assembly status register 3712 indicating a success status (all the bits with a rank order of 0 to 11 of the descriptor 822 having the value 1). The value of the index counter remains equal to 1. An MSDU whose 1st block corresponds to the bit with a rank order of 8 of the descriptor 800 and whose size is 32×index counter+11−8+1, i.e. 36, can then be transmitted to the application.

Figure 9:
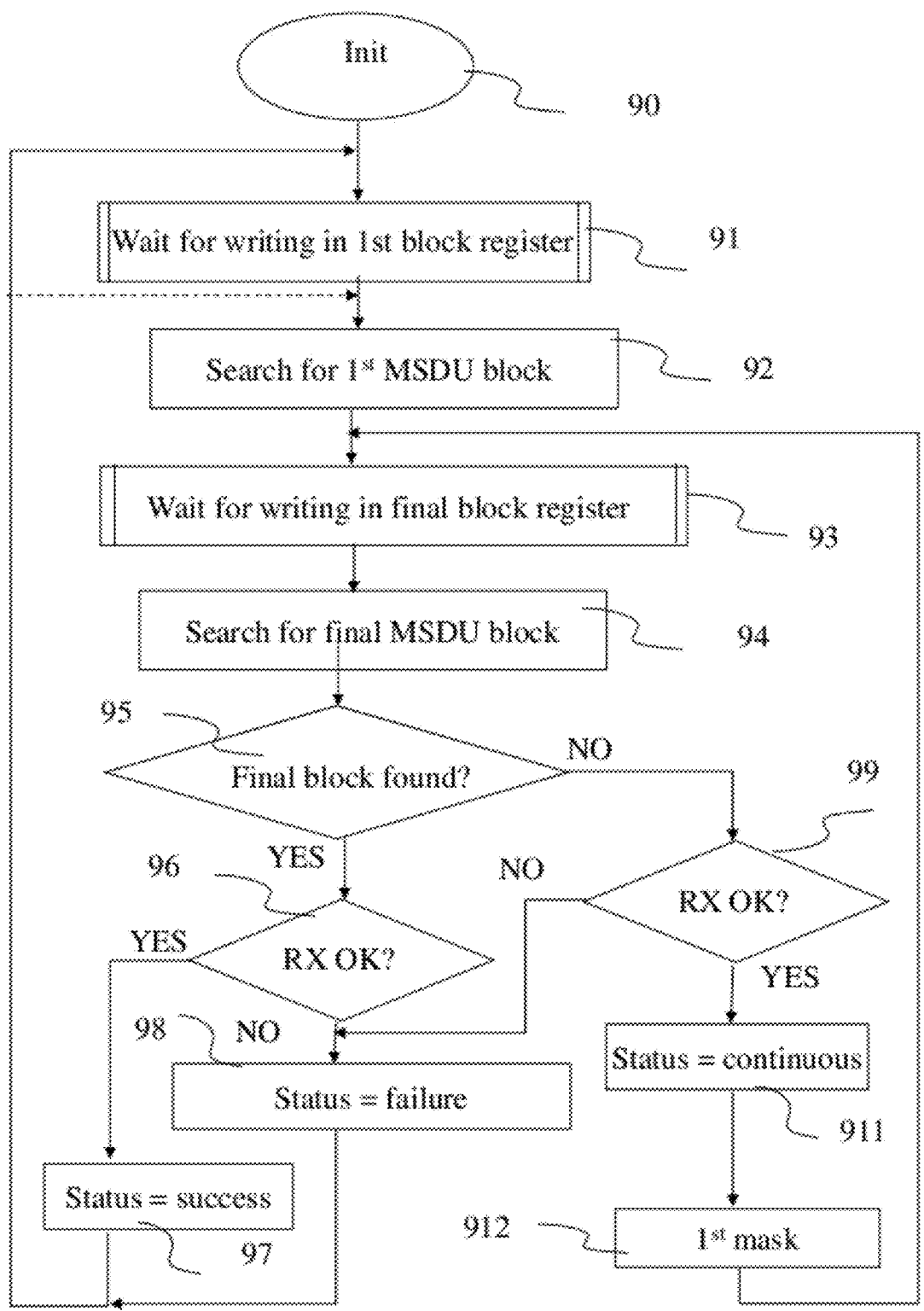

FIG. 9 shows an algorithm implemented by the module 37 to update the registers 3710 to 3712.

Following an initialization step 90, during a step 91, the module 37 waits for a writing in the first block register 3700. Then, during a step 92, the module 37 looks for a first MSDU block. For this operation, the register 3700 is read, the first 1 bit is searched for and its rank order is stored in the register 3710. The operation entailing the conversion of the content of the descriptor 3700 into a first 1 bit rank order value is particularly suitable for a purely hardware implementation by one or more logic circuits or by a part of logic circuits. A state table conversion, for example, can be used for this purpose. A first 32-bit mask is created whose bits with a rank order strictly less than the rank order of the first identified bit are 0 and all the other bits are 1. A synchronization Boolean indicating that the content of the register 3700 is in phase with the content of the registers 3701 and 3702 is initialized to 1.

Then, during a step 93, the module 37 waits for a writing in the registers 3701 and 3702. Once these registers are updated, the module 37 checks whether the register 3701 contains a 1 with a rank order higher than or equal to the rank order of the first block. To do this, it carries out a bit-by-bit "AND" operation with the first mask and a search for the first 1 bit is carried out on the result of the "AND" operation. This search is preferably carried out in the same way as the search for the rank order of the first block.

During a step 94, the module 37 searches for the presence of a final MSDU block in the register 3701 and, during a test 95, it checks whether final block rank order has been found.

If not, during a test 99, the module 37 checks whether the bits of the register 3702 with a rank order higher than or equal to the rank order of the first block if the first block corresponds to the current descriptor (1 synchronization Boolean) or 0 if the first block corresponds to a preceding descriptor (0 synchronization Boolean) are all equal to 1. To do this, it carries out:
   an "AND" operation with FFFFFFFFH if the synchronization Boolean is 0;
   a bit-by-bit "OR" operation with the inverse of the first mask to set to 1 any bits positioned before the bit whose rank order corresponds to the first block, then a bit-by-bit "AND" operation between the result of the "OR" operation and FFFFFFFFH.

An "AND" operation is carried out on all of the bits resulting from this operation. If the result is equal to 1, as from the first received block, all the blocks corresponding to the current descriptor are correctly received.

If the result of the test 99 is positive, then, during a step 911, the register 3712 is then updated with a status corresponding to continuous.

Then, during a step 912, the first masque is updated with a value 0 and the step 93 is reiterated.

Following a positive result of the test 95, during a test 96, the module 37 checks whether the bits of the register 3702 with a rank order higher than or equal to the rank order of the first block if the first block corresponds to the current descriptor (1 synchronization Boolean) or 0 if the first block corresponds to a preceding descriptor (0 synchronization Boolean), and with a rank order lower than or equal to the rank order of the final block are all equal to 1. To do this, it first updates a second mask whose bits with a rank order lower than or equal to the rank order of the final bit are equal to 1 and the other bits are equal to 0. Then, the module 37 carries out a bit-by-bit "OR" operation with the content of the register 3702, then, with this result, it carries out:
   an "AND" operation with FFFFFFFFH if the synchronization Boolean is 0;
   a bit-by-bit "OR" operation with the inverse of the first mask to set to 1 any bits positioned before the bit whose rank order corresponds to the first block, then a bit-by-bit "AND" operation between the result of the "OR" operation and FFFFFFFFH.

An "AND" operation is carried out on all of the bits from the result of this operation.

If the result is equal to 1, all the blocks corresponding to the current descriptor are correctly received between the first and final blocks inclusive. Then, during a step 97, the value of the rank order of the final block is stored in the register 3711, and the register 3712 corresponding to a success status is updated. A subsequent reading of the first block register 3700 enables the CPU 37 to recognize the status of the corresponding descriptor following an assembly success indication. The update of the register 3700 is preferably automatic during, in particular, the reading of a success status in the register 3712 (step 97) and/or a reading of the register 3700 (whereby said operation may be independent of the step 97). It is, for example, carried out by the module 372 following application of an "AND" operation between the current content of the register 3700 and a 32-bit mask comprising ones, except at the position of the first block defined by the content of the register 3710. Thus, the register 3700 contains a 0 in place of the 1 with a rank order corresponding to the content of the register 3710. Following the step 97, the step 91 is reiterated.

If the result is not equal to 1 during tests 96 or 99, at least one block corresponding to the current descriptor is not correctly received between the first and final blocks inclusive. Then, during a step 98, the register 3712 is updated with a status corresponding to a failure. Following a reading of the register 3712, one of the steps 91 or 92 is reiterated. In fact, the step 92 may be reiterated immediately without waiting for the storage of new blocks, since blocks following the incorrectly received or stored blocks may enable the assembly of an MSDU: According to certain embodiments, following the step 98, the step 91 is systematically reiterated. According to other embodiments, the choice between the step 91 and the step 92 is made by a software command, an electronic configuration and/or any given parameter definition.

The invention is, of course, not limited to the embodiments described above.

In particular, the architecture of the transmission/reception device may differ from that shown in FIG. 3, in the respective function and/or form of the elements (the functions of the electronic elements may in particular be combined into a restricted number of components or, conversely, may be split up among a plurality of components) and their arrangement.

Moreover, the received block management module may also have a different structure, whereby the translation functions may, in particular, be integrated into one of the modules associated with the registers.

Furthermore, according to the invention, the received block management module may be associated with all of the descriptors or, conversely, the device may comprise a plurality of received block management modules, whereby each of these modules is associated with one or more descriptors.

Moreover, the invention is not limited to the reception of data according to a wireless communications standard (for example IEEE802.16), but also relates to any data packet reception method using received packet block descriptors.

Moreover, according to variants of the invention, the received packet descriptors are not necessarily associated with descriptors of first MSDU packets, final MSDU packets and correctly received packets, but correspond to any type of specific status which enables a reassembly of data packets whose blocks are stored.

According to one variant of the invention, the electronic block management module only implements one or two functions for determining first MSDU blocks, final MSDU blocks and correctly received blocks which do or do not have a predetermined value as from a particular rank order or up to a particular rank order. Thus, for example, according to variants, the electronic module 370 implements registers with write access which correspond respectively to:
  a first packet block number (for example the BSN ("Block Sequence Number") block according to the IEEE 802.16 standard);
  a final packet block number (for example the BSN block according to the IEEE 802.16 standard);
  a correctly stored or received block descriptor; and
  a block number corresponding to the first bit (or field) of the correctly stored or received block descriptor.

According to one variant, the final register (block number corresponding to the first bit (or field) of the correctly stored or received block descriptor) is omitted, as its value may correspond by default to that of the first register (first packet block number). In these embodiments, only the status register is updated by the electronic block management module.

Moreover, the invention is not limited to wireless transmissions, but also relates to all the transmissions on any given medium, and in particular on noisy wired channels or on a recording channel.

According to the embodiment described, the electronic module 370 contains a single first block register, a single final block register and a single final received block register. According to variants of the invention, the module 370 contains a plurality of descriptors relating to one, two or three of these registers, or reads the content of these registers directly into the memory 33, whereby a pointer to a first descriptor is provided by the CPU and/or is configured by default. According to this variant, the module 370 can then search automatically for the final block of an MSDU if all the intermediate blocks are correctly received, and may contain an index counter register which it automatically increments. The CPU can then read information representing the size of an MSDU which can be assembled directly into this index counter register, and can obtain a success status even without reading the status register. In this case, the continuous status only appears if no present valid descriptor includes the final MSDU block identifier following the identification of a first MSDU block followed by correctly received blocks.

According to other embodiments which may be advantageously combined with the variants described above, the module 370 contains a plurality of result registers of the same type in order to enable the storage in parallel of a plurality of statuses corresponding to distinct MSDUs: Thus, quadruplets of result registers may be provided, including, for each MSDU identified by the presence of a first block (and/or a final block): a register indicating the rank order of a first block, a register indicating the rank order of a final block, a register indicating the status (assembly possible or not, and possibly the reason for the assembly not being possible) of an MSDU, and the size of the MSDU. In this way, the determination of the MSDUs which can be assembled is essentially effected with the electronic module(s), with little or no involvement on the part of the CPU.

The invention claimed is:

1. A method for assembling data blocks to form at least one data packet, comprising:
  writing in a first register of at least one first descriptor, each first descriptor comprising information representing a first status of each block belonging to a set of blocks, whereby the first status of each block is associated to one bit, which value indicates whether or not said block is a first packet block;
  writing in a second register of at least one second descriptor, each second descriptor comprising information representing a second status of each block belonging to said set of blocks, whereby the second status of each block is associated to one bit, which value indicates whether or not said block is a final packet block;
  writing in a third register of at least one third descriptor, each third descriptor comprising information representing a third status of each block belonging to said set of blocks, whereby the third status of each block is associated to one bit, which value indicates whether or not said block has been stored;
  determining from said information comprised in said first, second and third descriptors a status of at least part of said set, said status being recorded in a fourth register and indicating whether or not it is possible to assemble the blocks of said at least part of said set;
  assembling said blocks of said at least part of said set according to the status recorded in said fourth register to form a packet.

2. The method according to claim 1, wherein said determining the status recorded in the fourth register is carried out in at most a number of clock cycles strictly less than the size of the first register expressed as a number of binary data.

3. The method according to claim 2, wherein said determining the status recorded in the fourth register is carried out in at most one clock cycle.

4. The method according to claim 1, wherein the writing of said first, second and third registers involves a purely electronically update of said fourth register.

5. The method according to claim 1, further comprising determining the position of a first packet block by
  determining the first block in a packet on the basis of the content of said first register, and recording of an identifier of said first block in a fifth register;
  said assembly of a packet containing said blocks of said set being carried out according to said identifier recorded in said fifth register.

6. The method according to claim 5, wherein said step to determine the first block in a packet is an elementary step carried out in at most a number of clock cycles strictly less than the size of the first register expressed as a number of binary data.

7. The method according to claim 5, further comprising determining the number of blocks in a packet to be assembled according to the content of said fifth and sixth registers.

8. The method according to claim 1, further comprising determining the position of a final packet block by
determining the final block in a packet on the basis of the content of said second register, and recording of an identifier of the final block in a packet to be transmitted in a sixth register;
said assembly of a packet containing said blocks of said set being carried out according to said identifier recorded in said sixth register.

9. The method according to claim 8, wherein said determining the final block in a packet is carried out in at most a number of clock cycles strictly less than the size of the sixth register expressed as a number of binary data.

10. The method according to claim 8, wherein said determining the final packet and a said determining the status are simultaneous.

11. The method according to claim 8, wherein said determining the status and said determining the final block are reiterated for as long as the status stored in the second register indicates that packets are stored or that a final packet block has not been identified.

12. The method according to claim 1, wherein said status recorded in said fourth register belongs to a set which comprises:
packet assembly status possible;
packet assembly status not possible because the end of the packet has not been detected;
packet assembly status not possible because at least part of the packet is not stored;
packet assembly status not possible because at least part of the packet has not been received.

13. The method according to claim 1, further comprising receiving a data block and said status associated with each block indicates whether or not said block has been correctly received.

14. The method according to claim 13, wherein the blocks are received in data frames transmitted on a wireless channel.

15. The method according to claim 14, wherein the data frames are transmitted according to an IEEE802.16 communication protocol.

16. A device for assembling data blocks to form at least one data packet, comprising:
a first register for recording at least one first descriptor, each first descriptor comprising information representing a first status of each block belonging to a set of blocks, whereby the first status of each block is associated to one bit, which value indicates whether or not said block is a first packet block;
a second register for recording at least one second descriptor, each second descriptor comprising information representing a second status of each block belonging to said set of blocks, whereby the second status of each block is associated to one bit, which value indicates whether or not said block is a final packet block;
a third register for recording at least one third descriptor, each third descriptor comprising information representing a third status of each block belonging to said set of blocks, whereby the third status of each block is associated to one bit, which value indicates whether or not said block has been stored;
a filter for determining from said information comprised in said first, second and third descriptors a status of at least part of said set, said status being recorded in a fourth register and indicating whether or not it is possible to assemble the blocks of said at least part of the set;
assembler for assembling said blocks of said at least part of said set according to said status recorded in said fourth register to form a packet.

* * * * *